United States Patent
Matza et al.

(10) Patent No.: US 9,505,641 B2
(45) Date of Patent: *Nov. 29, 2016

(54) PROCESS FOR DECONTAMINATION OF HAZARDOUS SULFUR COMPOUNDS IN SOUR WATER TANKS

(71) Applicant: United Laboratories International, LLC, Houston, TX (US)

(72) Inventors: Stephen D. Matza, Sugar Land, TX (US); Jack G. Frost, Duncan, OK (US)

(73) Assignee: United Laboratories International, LLC, Houston, TX (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/278,279

(22) Filed: May 15, 2014

(65) Prior Publication Data
US 2014/0246382 A1 Sep. 4, 2014

Related U.S. Application Data

(63) Continuation of application No. 13/107,480, filed on May 13, 2011, now Pat. No. 8,758,631.

(60) Provisional application No. 61/346,006, filed on May 18, 2010.

(51) Int. Cl.
*C02F 1/72* (2006.01)
*C02F 101/10* (2006.01)
*C02F 103/36* (2006.01)

(52) U.S. Cl.
CPC ......... *C02F 1/722* (2013.01); *C02F 2101/101* (2013.01); *C02F 2103/365* (2013.01)

(58) Field of Classification Search
CPC .............. C02F 1/722; C02F 2101/101; C02F 2103/365
See application file for complete search history.

(56) References Cited

U.S. PATENT DOCUMENTS

| | | |
|---|---|---|
| 4,160,656 A | 7/1979 | Junkermann |
| 4,178,351 A | 12/1979 | Klebe et al. |
| 5,180,517 A | 1/1993 | Woods |

OTHER PUBLICATIONS

Office Action for U.S. Appl. No. 13/107,480 dated Oct. 22, 2013.
Notice of Allowance for U.S. Appl. No. 13/107,480 dated Feb. 3, 2014.

*Primary Examiner* — Lucas Stelling
(74) *Attorney, Agent, or Firm* — Tumey L.L.P.

(57) ABSTRACT

A method for decontaminating a liquid having sulfides includes preparing a stabilized sodium percarbonate solution. In an embodiment, the method includes decontaminating a liquid. The liquid comprises reactive sulfides. The method also includes preparing a stabilized sodium percarbonate solution, which includes adding sodium percarbonate to a liquid solution. The liquid solution comprises a peroxide stabilizer and an acid. The method further includes dosing the liquid into the stabilized sodium percarbonate solution to decontaminate the liquid by oxidizing at least a portion of the reactive sulfides, wherein at least a portion of the reactive sulfides comprise solids.

20 Claims, 2 Drawing Sheets

PROCESS FOR DECONTAMINATION OF HAZARDOUS SULFUR COMPOUNDS IN SOUR WATER TANKS

CROSS-REFERENCE TO RELATED APPLICATIONS

This application is a non-provisional application that claims the benefit of U.S. application Ser. No. 13/107,480 filed on May 13, 2011, that claims the benefit of U.S. application Ser. No. 61/346,006 filed on May 18, 2010, the disclosures of which are incorporated by reference herein in their entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of decontamination and more specifically to the field of decontaminating equipment and liquids of hazardous sulfur compounds using a stabilized sodium percarbonate solution.

2. Background of the Invention

Refineries and petrochemical facilities are typically contaminated with dangerous and reactive sulfur compounds such as hydrogen sulfide and pyrophoric iron sulfides. Conventionally, these reactive sulfur compounds are mitigated or removed as part of decontamination prior to vessel entry. Such mitigation and removal may include oxidizing and eliminating the hydrogen sulfide and pyrophoric iron sulfides. Chemicals that have been used for such oxidation and elimination include potassium permanganate, persulfates, sodium nitrite, ozone, hypochlorite, and adducts of hydrogen peroxide (i.e., perborates and percarbonates).

The use of such chemicals includes certain drawbacks. For instance, drawbacks include that persulfates may be corrosive. In addition, ozone and potassium permanganate are field mixed. Potassium permanganate decontaminations also include the drawback that large amounts of reaction solids are processed at additional costs. Further, sodium nitrite uses heat input for reasonable reaction times and also produces ammonia as a byproduct. Hypochlorite may form dangerous chlorine compounds. Perborate and percarbonates are typically field mixed.

Consequently, there is a need for an improved process for decontaminating equipment and liquids of hydrogen sulfide, pyrophoric iron sulfides, and other reactive sulfides.

BRIEF SUMMARY OF SOME OF THE PREFERRED EMBODIMENTS

These and other needs in the art are addressed in one embodiment by a method for decontaminating a liquid. The liquid comprises reactive sulfides. The method comprises preparing a stabilized sodium percarbonate solution, which includes adding sodium percarbonate (i.e., a solid sodium percarbonate) to a liquid solution. The liquid solution comprises a peroxide stabilizer and an acid. The method further includes dosing the liquid into the stabilized sodium percarbonate solution to decontaminate the liquid by oxidizing at least a portion of the reactive sulfides.

These and other needs in the art are addressed in another embodiment by a method for preparing a stabilized sodium percarbonate solution. The method comprises adding sodium percarbonate (i.e., a solid sodium percarbonate) to a liquid solution. The liquid solution comprises a peroxide stabilizer and an acid. The method further includes allowing the sodium percarbonate and the liquid solution to mix for a time period to prepare the stabilized sodium percarbonate solution.

These and other needs in the art are addressed in a further embodiment by a method for decontaminating a liquid, wherein the liquid comprises reactive sulfides. The method comprises preparing a stabilized sodium percarbonate solution, wherein the preparing comprises adding sodium percarbonate to a liquid solution, and wherein the liquid solution comprises a peroxide stabilizer and an acid. The method further includes dosing the liquid into the stabilized sodium percarbonate solution to decontaminate the liquid by oxidizing at least a portion of the reactive sulfides, wherein at least a portion of the reactive sulfides comprise solids.

These and other needs in the art are addressed in other embodiments by a method for decontaminating a liquid through exposure to a prepared stabilized sodium percarbonate solution. The method comprises adding sodium percarbonate to a liquid solution, wherein the liquid solution comprises a peroxide stabilizer and an acid. The method further includes allowing the sodium percarbonate and the liquid solution to mix for a time period to prepare the stabilized sodium percarbonate solution. Additionally, the method further includes adding the stabilized sodium percarbonate solution to a container. Finally, the method includes adding the liquid to the container over a time period of less than about three hours to produce a decontaminated liquid, wherein the decontaminated liquid comprises substantially no undissolved solids.

The foregoing has, outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
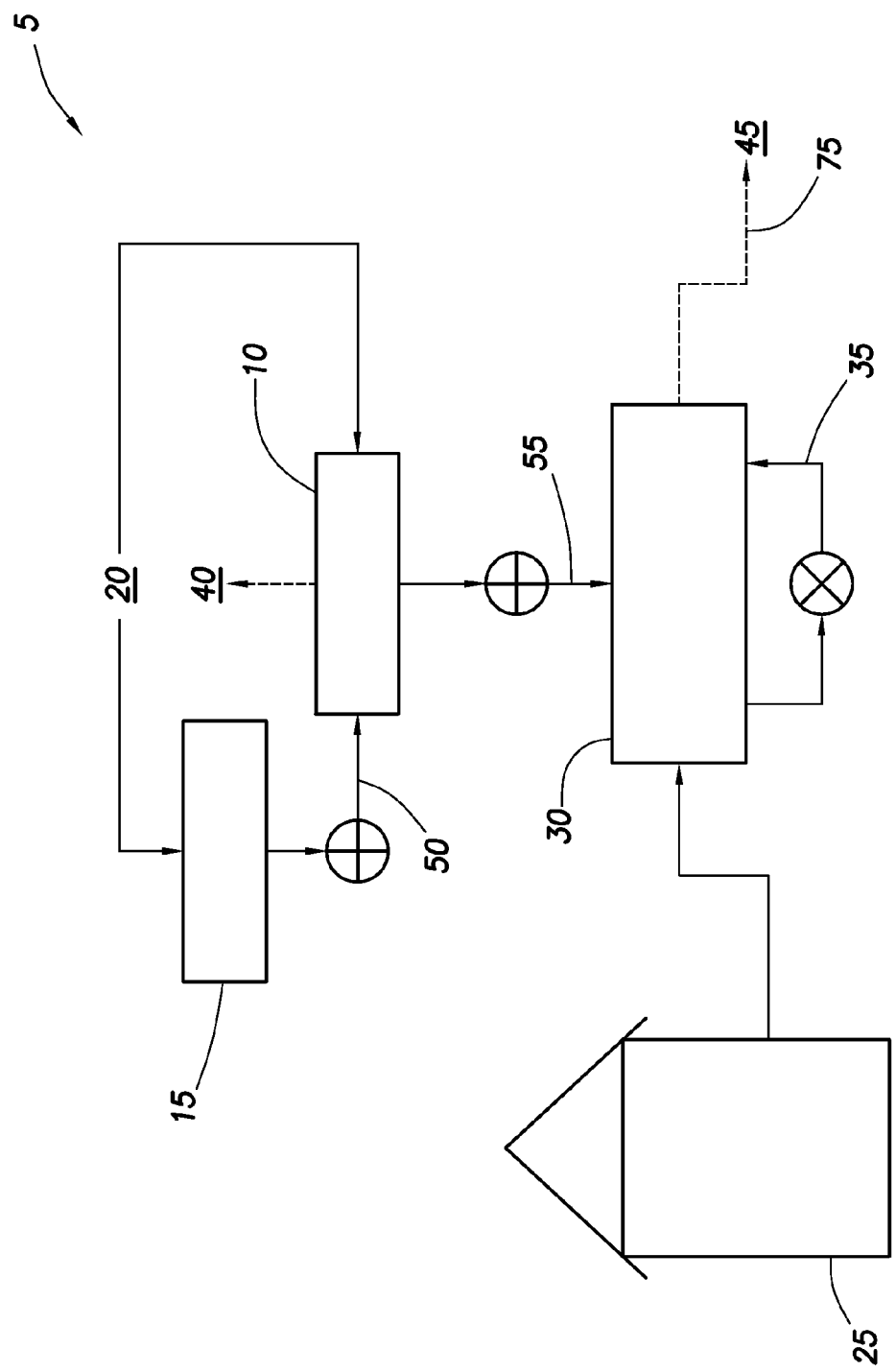
FIG. 1 illustrates an embodiment of a percarbonate field treatment process.

In an embodiment, a decontamination process includes using a stabilized sodium percarbonate solution for decontaminating a contaminated liquid. The contaminated liquid is a liquid contaminated with one or more sulfide contaminants. In an embodiment, the liquid is water. The sulfide contaminants may include any sulfide contaminants. For instance, the sulfide contaminants may include reactive sulfides. Without limitation, examples of reactive sulfides include hydrogen sulfide, pyrophoric iron sulfides, and mercaptans. In an embodiment, the reactive sulfide is hydrogen sulfide. In some embodiments, the contaminated liquid is sour water. Decontaminating the liquid includes oxidizing and removing reactive sulfides from the contaminated water. In embodiments, at least a portion of the reactive sulfides are oxidized. In an embodiment, substantially all of the reactive sulfides are oxidized.

In embodiments, the decontamination process includes a process for preparing a stabilized sodium percarbonate solution. Such process includes adding sodium percarbonate to a liquid solution that contains a stabilizer and an acid to provide a reaction that produces the stabilized sodium percarbonate solution. The stabilized sodium percarbonate solution may be prepared in any suitable container. In an embodiment, the stabilized sodium percarbonate solution is prepared in mix tanks such as field vessels. In an embodiment, the mix tank is not agitated. Without being limited by theory, the stabilized sodium percarbonate solution may be produced without agitation in the mix tank because the reaction of the sodium percarbonate with the liquid solution provides a sufficient reaction to mix the sodium percarbonate and liquid solution and produce the stabilized sodium percarbonate solution. In some alternative embodiments, the mix tank is agitated to produce the stabilized sodium percarbonate solution. The sodium percarbonate and liquid solution may be allowed to mix for any suitable period of time to allow dissolution of the sodium percarbonate in the liquid solution. In an embodiment, the sodium percarbonate and liquid solution are mixed from about one hour to about two hours, alternatively from about one hour to about 1.5 hours, and alternatively about one hour. Without being limited by theory, the suitable period of time is any period of time to accomplish sufficient mixing of the sodium percarbonate and liquid solution to produce the stabilized sodium percarbonate solution.

In embodiments, the stabilized sodium percarbonate solution has a strength retention from about 90% to about 99%, alternatively from about 92% to about 97%, and alternatively about 96.0%. It is to be understood that strength retention refers to the maintenance of active sodium percarbonate in solution.

The sodium percarbonate may be in any suitable form. In embodiments, the sodium percarbonate is in a solid form. In some embodiments, the sodium percarbonate comprises a coating. Any coating that dissolves in a liquid and that is suitable for use in dissolution of the sodium percarbonate in the liquid solution may be used. In an embodiment, the coating is a sodium silicate. Without limitation, the coating provides stability to the sodium percarbonate during the solid phase of the sodium percarbonate. The coating may be of any suitable thickness for providing the stability. In an embodiment, the sodium percarbonate comprises from about 1.0 wt. % to about 2.0 wt. % of the coating. In an embodiment, the liquid solution is a water solution.

Any stabilizer suitable for stabilizing the sodium percarbonate solution (e.g., the solution of sodium percarbonate and the liquid) may be used. In embodiments, the stabilizer is a peroxide stabilizer. In some embodiments, the stabilizer includes nitrilotrimethylenephosphonate (NTMP); tartrazine; 1-hydroxyethylidene-1,1 diphosphonic acid; or any combinations thereof. In an embodiment, the stabilizer comprises NTMP, tartrazine, or any combinations thereof. In some embodiments, the stabilizer is tartrazine.

The acid may be any acid suitable to bring the sodium percarbonate to a neutral or desired pH level. In an embodiment, the acid comprises citric acid, phosphoric acid, or any combinations thereof. In some embodiments, the acid is phosphoric acid. Without being limited by theory, an embodiment using citric acid, phosphoric acid, or any combinations thereof also removes ammonia from the contaminated liquid. For instance, the acid produces liquid salts such as ammonium citrate or ammonium phosphate from the ammonia in the stabilized sodium percarbonate solution. The ammonia is thereby not available as a vapor. Further, without being limited by theory, preparing the stabilized sodium percarbonate solution minimizes loss of oxidative strength over a period of time. Therefore, without limitation, the stabilized sodium percarbonate solution has minimized peroxide degradation over a long term and provides ammonia neutralization.

In an embodiment, the liquid solution contains from about 0.01 wt. % to about 0.5 wt. % of peroxide stabilizer (i.e., tartrazine), alternatively from about 0.01 wt. % to about 0.05 wt. % peroxide stabilizer (i.e., tartrazine), and alternatively about 0.05 wt. % peroxide stabilizer (i.e., tartrazine). The liquid solution contains a sufficient amount of acid to maintain the pH of the liquid solution below 7.0 pH, alternatively below about 6.5 pH, and alternatively from about 5.5 pH to about 6.5 pH. In an embodiment, the acid is phosphoric acid. In such embodiments, the phosphoric acid may be any suitable percent phosphoric acid. For instance, the phosphoric acid may be 75% phosphoric acid or 85% phosphoric acid. The liquid solution may contain any suitable amount of the acid to maintain the desired pH level. In embodiments, the liquid solution contains from about 4.0 vol. % phosphoric acid to about 8.0 vol. % phosphoric acid, alternatively from about 5.0 vol. % phosphoric acid to about 7.0 vol. % phosphoric acid, and alternatively about 6.0 vol. % phosphoric acid. In embodiments in which the acid is citric acid, the liquid solution contains citric acid in amounts that maintain pH at levels about commensurate with those in phosphate-buffered solutions.

In an embodiment, the stabilized sodium percarbonate solution is prepared remote from the site at which it is to be used. After preparation, the stabilized sodium percarbonate solution is then mixed with the contaminated liquid. In one embodiment, the stabilized sodium percarbonate solution is placed in a mix tank, and the contaminated liquid (i.e., sour water) is added to the mix tank. In embodiments, the sour water is dosed into the mix tank over a time period. In embodiments, the time period is less than about 3 hours, alternatively less than about 2 hours, and alternatively less than about 1 hour, and further alternatively about 1 hour. In an embodiment, the sour water is dosed in to the stabilized sodium percarbonate solution over desired time periods to minimize the exotherm associated with percarbonate oxidation of hydrogen sulfide. Without being limited by theory, the reaction is about instantaneous and may be about complete within about 1 hour with slow dosing (i.e., the desired time periods). In alternative embodiments, the contaminated liquid may be placed in a mix tank and treated with the stabilized sodium percarbonate solution.

In embodiments, the decontamination process includes stoichiometric equations for producing the stabilized sodium percarbonate solution. In an embodiment, Equation (1) comprises:

$$8Na_2CO_3 \cdot 1.5H_2O_2 + 3H_2S \rightarrow 8Na_2Co_3 + 12H_2O + 3H_2SO_4.$$

Equation (2) comprises:

$$2Na_2CO_3 \cdot 1.5H_2O_2 + 3H_2S \rightarrow 2Na_2CO_3 + 6H_2O + 3S°.$$

Equation (3) comprises:

$$8Na_2CO_3 \cdot 1.5H_2O_2 + 6H_2S \rightarrow 8Na_2CO_3 + 15H_2O + 3H_2S_2O_3.$$

FIG. 1 illustrates an embodiment of a decontamination process 5 in which water 20 is added to a sodium percarbonate solid 10. Water 20 is also added to an acid solid 15 (e.g., citric acid solid) to produce acid 50. Acid 50 is dosed in to the sodium percarbonate. In an embodiment, the acid 50 is dosed in over the course of about one hour, alternatively from about 0.5 hours to about 2 hours. Without being limited by theory, the acid 50 is dosed in over such time periods to control carbon dioxide 40 evolution. In some embodiments (not illustrated), a peroxide stabilizer (e.g., tartrazine) is also added to the sodium percarbonate. In alternative embodiments (not illustrated), the acid 50 is already prepared, and water 20 may not be further added to the acid 50. In other alternative embodiments (not illustrated), the acid 50 is already prepared, and water 20 may be further added. The percarbonate solution 55 is added to the mix tank 30 with sour water 25. The decontaminated water 75 is then sent to waste water treatment 45. In some embodiments, the reaction in the mix tank 30 produces a clear solution of an oxidized form of hydrogen sulfide (e.g., dissolved sulfate salt, elemental sulfur, and thiosulfate salt), no additional solids, and a neutral pH that is acceptable to waste water treatment facilities. In some embodiments, cooling water 35 is fed back into the mix tank 30. The cooling water 35 may be fed at any temperature suitable to reduce the temperature in mix tank 30. In embodiments, the cooling water 35 is fed at a temperature from about 80° F. to about 140° F., alternatively from about 80° F. about 120° F. Without limitation, cooling water 35 is used to provide a further measure of control of the exotherms. In some embodiments (not illustrated), chemicals such as ZYME-OX® or ZYME-FLOW® (commercially available from United Laboratories International, LLC) may be added to the mix tank 30 or to the sour water 25.

Additional advantages of the stabilized sodium percarbonate solution include favorable economics such as cheaper raw material costs. Further advantages include improved reaction times. In addition, advantages of the stabilized sodium percarbonate solution include that it may not produce dangerous by-products or additional solids. Moreover, because the product may be prepared and stored prior to use at the site, further advantages include improved execution time. Additionally, cost savings are from the clear solution reaction product that differs from permanganate cleanings, which typically produce reaction solids of manganese oxides that are processed. The stabilized sodium percarbonate solution also involves reduced treatment volumes in relation to permanganate decontamination, which may involve less waste water to process.

It is to be understood that the stabilized sodium percarbonate defines a process for limiting reaction exotherms. Moreover, the option of formulating with an amine oxide surfactant differentiates the composition. The amine-N-oxide surfactant is useful as a means to aid in the penetration of the sodium percarbonate solution into encrustations. It also provides supplemental sulfide-oxidizing capability.

To further illustrate various illustrative embodiments of the present invention, the following examples are provided.

EXAMPLES

Example I

Figure 2:
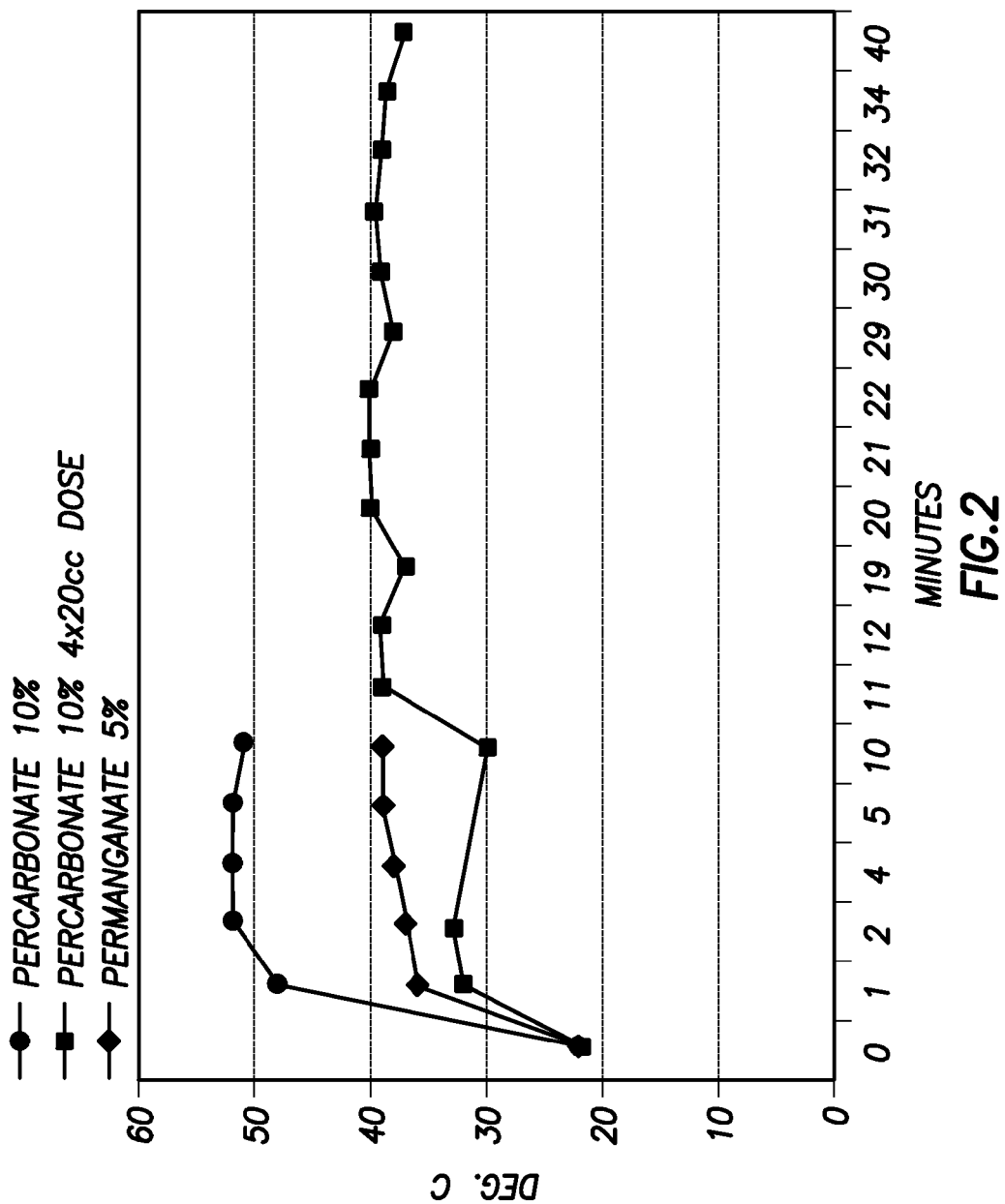
FIG. 2 illustrates test results with temperature (° C.) plotted versus minutes.

Percarbonate solutions in water may exceed a pH of 11, therefore, a 10% percarbonate solution was prepared in water buffered by citric acid to a pH of about 8. In the laboratory tests below in Table I, a noticeable exotherm was observed when the percarbonate solution was added directly to sour water. The percarbonate experiments were conducted at ambient conditions, and an exotherm was observed. A second dose of percarbonate was added at the 3 hour mark to reach a stoichiometric amount. The percarbonate experiments started at a pH of 8.8 (citric buffered) and ended at a pH of 9.3. This exotherm was evaluated in a side-by-side study with the industry standard, permanganate, which may have a mild associated exotherm. In these tests, 5% permanganate (a typical treatment strength) and 10% percarbonate were added in a single dose to a measured amount of sour water. In a third test, the percarbonate solution was also added in ¼ doses every 10 minutes. The results of the tests are shown in FIG. 2 where temperature (C) is plotted versus minutes.

TABLE I

| Sour Water Treatment Experiments | | | |
|---|---|---|---|
| Time (Hrs) | Percarbonate (Ambient) | Percarbonate - Dosed (Ambient) | Comments |
| 0 | 11500 | 10200 | |
| 1 | 1037 | 1 | |
| 2 | | | |
| 3 | 969 | | Add additional percarbonate |
| 4 | | | |
| 5 | 0.23 | | |
| 6 | | | |
| 22 | | | |

The single dose experiments showed that percarbonate has roughly twice the exotherm exhibited by permanganate—30 versus 17° C. This was consistent with theoretical data based on the heat of formation, which predicted the percarbonate reaction with hydrogen sulfide produced 897 kcal/gm-mole. This heat was roughly twice the 430 kcal/gm-mole produced by $KMnO_4$. The lab tests also demonstrated that staged addition of the percarbonate may limit the exotherm to a level no more than that exhibited by permanganate. This may be accomplished by staged additions of the percarbonate over a time as short as 40 minutes.

In Table I, it may be seen that percarbonate treatments removed hydrogen sulfide very fast. In the first attempt, an insufficient amount was added initially, and when the stoichiometric amount was added, hydrogen sulfide removal (as measured in parts per million $H_2S$) was quickly completed. A second experiment was performed by staging the sodium percarbonate addition, and at the conclusion of the 1 hour dosing, hydrogen sulfide removal was complete. Percarbonate oxidation of hydrogen sulfide was found to be quicker than that with nitrite.

It is also notable that a percarbonate treatment of sour water left a clear solution containing soluble sulfate salt at a near neutral pH and with no solids. This solution may be discharged to waste water treatment facilities with no issue. By contrast, permanganate treatments leave $MnO_2$ solids that must be removed prior to waste water treatment.

It has been found that the total process time for the embodiments of FIG. 1 is between 2 to 3 hours (i.e., 1 to 2 hours for the percarbonate dissolution and 1 hour dosed reaction time). It has also been found that in some embodiments, 1.6 gallons of sodium percarbonate solution treat 1 gallon of sour water. Moreover, the decontamination process may not use plant steam and may proceed at ambient conditions. In some embodiments, the final solution contained soluble salts at near neutral pH, which are suitable for waste water treatment facilities. Moreover, in embodiments, the final solution may not contain solids.

Example II

This example demonstrated the long-term stabilizing effect of tartrazine on sodium percarbonate formulations. Five samples containing about 9 wt. % sodium percarbonate and buffered to a pH of about 6 with phosphoric acid were prepared. The samples were treated with stabilizers as shown in Table II.

TABLE II

| Sample | Stabilizer |
| --- | --- |
| 1 | no stabilizer |
| 2 | 0.01 wt. % NTMP |
| 3 | 0.01 wt. % NTMP + 0.05 wt. % tartrazine |
| 4 | 0.01 wt. % NTMP + 0.05 wt. % tartrazine (also contained 5.0 wt. % MACAT AO-12, which is commercially available from Mason Chemical Company) |
| 5 | 0.05 wt. % tartrazine |

Samples 1-5 were allowed to stand at room temperature and were analyzed on a weekly basis over a period of one year with 0.10 N KMnO$_4$. Table III shows the results of the weekly analyses.

TABLE III

| Week | Sample 1 Percarbonate Content (wt. %) | Sample 2 Percarbonate Content (wt. %) | Sample 3 Percarbonate Content (wt. %) | Sample 4 Percarbonate Content (wt. %) | Sample 5 Percarbonate Content (wt. %) |
| --- | --- | --- | --- | --- | --- |
| 0 | 8.93 | 8.93 | 8.86 | 9.06 | 8.64 |
| 1 | 8.65 | 8.77 | 8.73 | 8.99 | 8.54 |
| 2 | 8.57 | 8.70 | 8.73 | 8.93 | 8.52 |
| 3 | 8.49 | 8.58 | 8.71 | 8.90 | 8.53 |
| 4 | 8.35 | 8.54 | 8.70 | 8.88 | 8.46 |
| 5 | 8.35 | 8.56 | 8.77 | 8.90 | 8.54 |
| 6 | 8.35 | 8.58 | 8.75 | 8.85 | 8.53 |
| 7 | 8.28 | 8.42 | 8.73 | 8.84 | 8.50 |
| 8 | 8.16 | 8.38 | 8.73 | 8.84 | 8.48 |
| 9 | 8.09 | 8.28 | 8.74 | 8.81 | 8.48 |
| 10 | 8.00 | 8.25 | 8.76 | 8.83 | 8.50 |
| 11 | 7.95 | 8.21 | 8.70 | 8.78 | 8.45 |
| 12 | 7.86 | 8.09 | 8.71 | 8.70 | 8.41 |
| 13 | 7.83 | 8.09 | 8.71 | 8.74 | 8.44 |
| 14 | 7.77 | 8.04 | 8.75 | 8.79 | 8.49 |
| 15 | 7.71 | 8.00 | 8.71 | 8.76 | 8.47 |
| 16 | 7.62 | 7.94 | 8.75 | 8.80 | 8.50 |
| 17 | 7.54 | 7.87 | 8.72 | 8.75 | 8.44 |
| 18 | 7.48 | 7.83 | 8.74 | 8.70 | 8.44 |
| 19 | 7.42 | 7.77 | 8.71 | 8.70 | 8.44 |
| 20 | 7.33 | 7.73 | 8.70 | 8.69 | 8.47 |
| 21 | 7.25 | 7.67 | 8.73 | 8.71 | 8.49 |
| 22 | 7.18 | 7.60 | 8.72 | 8.70 | 8.46 |
| 23 | 7.11 | 7.52 | 8.72 | 8.65 | 8.42 |
| 24 | 7.06 | 7.47 | 8.69 | 8.65 | 8.41 |
| 25 | 6.93 | 7.42 | 8.71 | 8.60 | 8.42 |
| 26 | 6.87 | 7.38 | 8.69 | 8.50 | 8.41 |
| 27 | 6.76 | 7.22 | 8.69 | 8.53 | 8.43 |
| 28 | 6.76 | 7.24 | 8.76 | 8.56 | 8.45 |
| 29 | 6.71 | 7.24 | 8.76 | 8.53 | 8.42 |
| 30 | 6.64 | 7.20 | 8.71 | 8.58 | 8.43 |
| 31 | 6.64 | 7.13 | 8.66 | 8.62 | 8.43 |
| 32 | 6.54 | 7.13 | 8.76 | 8.64 | 8.43 |
| 33 | 6.36 | 7.05 | 8.74 | 8.64 | 8.43 |
| 34 | 6.20 | 7.02 | 8.76 | 8.62 | 8.41 |
| 35 | 6.03 | 6.93 | 8.74 | 8.56 | 8.40 |
| 36 | 5.87 | 6.87 | 8.72 | 8.53 | 8.38 |
| 37 | 5.72 | 6.85 | 8.71 | 8.46 | 8.40 |
| 38 | 5.56 | 6.80 | 8.71 | 8.53 | 8.40 |
| 39 | 5.40 | 6.75 | 8.71 | 8.53 | 8.40 |
| 40 | 5.24 | 6.70 | 8.74 | 8.53 | 8.40 |
| 41 | 5.08 | 6.65 | 8.75 | 8.53 | 8.40 |
| 42 | 4.98 | 6.60 | 8.70 | 8.47 | 8.35 |
| 43 | 4.80 | 6.55 | 8.66 | 8.42 | 8.30 |
| 44 | 4.74 | 6.47 | 8.66 | 8.39 | 8.27 |
| 45 | 4.67 | 6.40 | 8.67 | 8.36 | 8.25 |
| 46 | 4.45 | 6.37 | 8.69 | 8.38 | 8.31 |
| 47 | 4.35 | 6.36 | 8.59 | 8.36 | 8.31 |
| 48 | 4.31 | 6.31 | 8.65 | 8.34 | 8.26 |
| 49 | 4.13 | 6.27 | 8.62 | 8.37 | 8.29 |
| 50 | 4.04 | 6.21 | 8.65 | 8.37 | 8.28 |
| 51 | 3.98 | 6.17 | 8.63 | 8.40 | 8.27 |
| 52 | 3.90 | 6.12 | 8.57 | 8.38 | 8.27 |

To provide a comparison between NTMP-treated sodium percarbonate and tartrazine-treated sodium percarbonate, data from Table III was selected at 3, 6, 9, and 12 months storage, and the percent percarbonate remaining was calculated. Table IV shows the results of the calculations.

TABLE IV

| Months in Storage | Sample 1 - wt. % percarbonate remaining | Sample 2 - wt. % percarbonate remaining | Sample 3 - wt. % percarbonate remaining | Sample 4 - wt. % percarbonate remaining | Sample 5 - wt. % percarbonate remaining |
| --- | --- | --- | --- | --- | --- |
| 3 | 88 | 91 | 98 | 96 | 98 |
| 6 | 77 | 83 | 98 | 94 | 97 |
| 9 | 60 | 76 | 98 | 94 | 97 |
| 12 | 44 | 69 | 97 | 92 | 96 |

It can be seen that tartrazine was a superior peroxide stabilizer to NTMP. For instance, after 12 months in storage, Sample 2 showed 69 wt. % percarbonate remaining, whereas the tartrazine treated Sample 5 showed 96 wt. % percarbonate remaining.

Although the present invention and its advantages have been described in detail, it should be understood that various changes, substitutions and alterations may be made herein without departing from the spirit and scope of the invention as defined by the appended claims.

What is claimed is:
1. A method for decontaminating a liquid, wherein the liquid comprises reactive sulfides, the method comprising:
    (A) preparing a stabilized sodium percarbonate solution, wherein the preparing comprises adding sodium percarbonate to a liquid solution, and wherein the liquid solution comprises a peroxide stabilizer and an acid; and
    (B) dosing the liquid into the stabilized sodium percarbonate solution to decontaminate the liquid by oxidizing at least a portion of the reactive sulfides, wherein at least a portion of the reactive sulfides comprise solids.
2. The method of claim 1, wherein the reactive sulfides comprise hydrogen sulfide.
3. The method of claim 1, further comprising allowing the sodium percarbonate and the liquid solution to mix for a time period from about one hour to about two hours.

4. The method of claim 1, wherein the sodium percarbonate comprises a coating.

5. The method of claim 1, wherein the peroxide stabilizer comprises tartrazine, nitrilotrimethylenephosphonate, or any combinations thereof.

6. The method of claim 1, wherein the peroxide stabilizer comprises tartrazine.

7. The method of claim 1, wherein the acid comprises citric acid, phosphoric acid, or any combinations thereof.

8. The method of claim 1, wherein the liquid solution comprises from about 0.01 wt. % to about 0.5 wt. % of peroxide stabilizer.

9. The method of claim 1, wherein the liquid solution comprises a sufficient amount of the acid to maintain the pH of the liquid solution from about 5.5 pH to about 6.5 pH.

10. The method of claim 1, further comprising dosing the liquid into the stabilized sodium percarbonate solution for a time period less than about three hours.

11. A method for decontaminating a liquid through exposure to a prepared stabilized sodium percarbonate solution, the method comprising:
(A) adding sodium percarbonate to a liquid solution in a container, wherein the liquid solution comprises a peroxide stabilizer and an acid;
(B) allowing the sodium percarbonate and the liquid solution to mix for a time period to prepare the stabilized sodium percarbonate solution;
(C) adding the liquid comprising reactive sulfide solids to the container over a time period of less than about three hours to produce a decontaminated liquid, wherein the decontaminated liquid comprises substantially no undissolved solids.

12. The method of claim 11, wherein the sodium percarbonate comprises a coating.

13. The method of claim 12, wherein the coating comprises a sodium silicate.

14. The method of claim 11, wherein the peroxide stabilizer comprises tartrazine, nitrilotrimethylenephosphonate, or any combinations thereof.

15. The method of claim 11, wherein the peroxide stabilizer comprises tartrazine.

16. The method of claim 11, wherein the acid comprises citric acid, phosphoric acid, or any combinations thereof.

17. The method of claim 11, wherein the liquid solution comprises from about 0.01 wt. % to about 0.5 wt. % of peroxide stabilizer.

18. The method of claim 11, wherein the liquid solution comprises a sufficient amount of the acid to maintain the pH of the liquid solution from about 5.5 pH to about 6.5 pH.

19. The method of claim 11, further comprising allowing the sodium percarbonate and the liquid solution to mix for a time period from about one hour to about two hours.

20. The method of claim 11, wherein the liquid solution comprises from about 4.0 vol. % phosphoric acid to about 8.0 vol. % phosphoric acid.

* * * * *